United States Patent [19]

Klingensmith et al.

[11] Patent Number: 4,536,537
[45] Date of Patent: Aug. 20, 1985

[54] RUBBERLESS HIGH IMPACT POLYPROPYLENE

[75] Inventors: G. Bruce Klingensmith; Richard O. Whitehead, both of Houston, Tex.; Thair L. Higgins, El Cerrito, Calif.

[73] Assignee: Shell Oil Company, Houston, Tex.

[21] Appl. No.: 623,049

[22] Filed: Jun. 21, 1984

[51] Int. Cl.$^3$ .............................................. C08K 5/01
[52] U.S. Cl. ................................................... 524/481
[58] Field of Search ....................................... 524/481

[56]        References Cited
       U.S. PATENT DOCUMENTS 2,590,834  4/1952  Faulkner et al. ..................... 524/481
2,924,584  2/1960  Wolinski ............................. 524/481
3,042,971  7/1962  Wolinski ............................. 524/481
3,201,364  8/1965  Salyer ................................. 524/474
4,170,586 10/1979  Clampitt et al. ............. 260/33.6 PQ
4,210,570  7/1980  Trotter et al. ...................... 524/481

FOREIGN PATENT DOCUMENTS 608730 11/1960  Canada ............................... 524/481

Primary Examiner—Joseph L. Schofer
Assistant Examiner—N. Sarofim
Attorney, Agent, or Firm—Dean F. Vance

[57] ABSTRACT

Blends of propylene homopolymers, linear low density ethylene copolymers and certain plasticizer oils possess extremely good impact resistance at low temperatures (−30° C.) along with good stiffness and blush.

8 Claims, 1 Drawing Figure

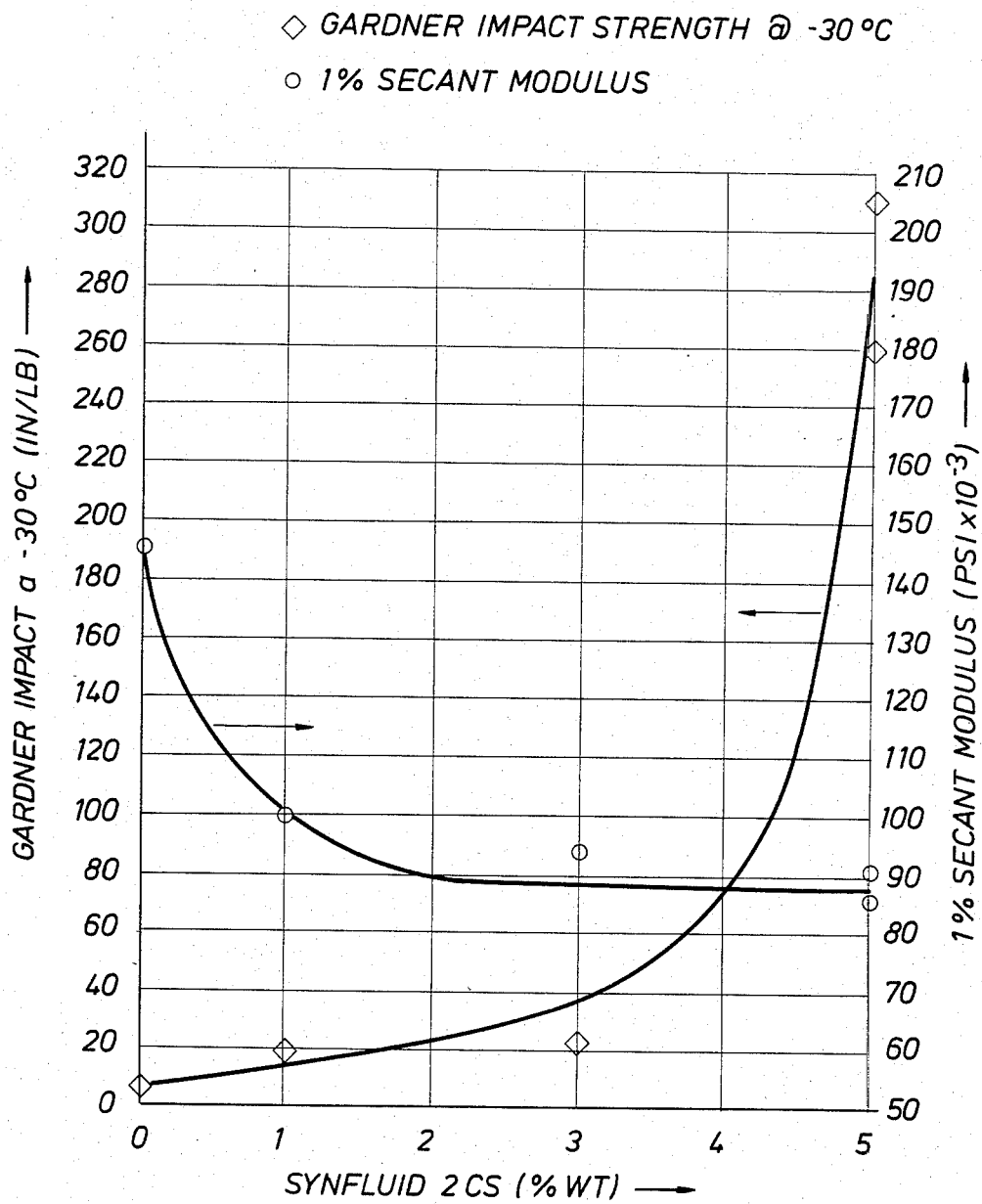

RUBBERLESS HIGH IMPACT POLYPROPYLENE

FIELD OF THE INVENTION

This invention relates to a polymeric composition having a high level of low temperature impact strength. This invention relates to such a composition having been prepared by blending together a propylene homopolymer, linear low density ethylene copolymer and a certain hydrocarbon plasticizer.

BACKGROUND OF THE INVENTION

Polypropylene is a well known commercial polymer, used for a variety of products such as packaging films and extruded and molded articles. It is produced by polymerization of propylene over transition metal coordination catalysts, specifically titanium halide containing catalysts. Commercial polypropylene, however, is deficient in resistance to impact at low temperatures, i.e., 0° C. and below (e.g. −30° C.). Polypropylene is disadvantaged in this low temperature toughness because of its comparatively high glass transition temperature. The several conventional methods of dealing with this deficiency for uses requiring low temperature exposure involve: (1) blending of homopolymer polypropylene with other polymers of lower Tg; (2) sequential ("block") copolymerization where the homopolymerization step is followed by a stage of copolymerization (usually ethylene-propylene) to produce what amounts to an in-situ reactor blend; and (3) a variety of hybrid combinations of blending and copolymerization. In all cases the blended-in or copolymerized component is rubbery or highly elastomeric in character. The criterion for low temperature toughness generally accepted for polypropylene by industry is a high value in the Gardner falling weight impact test at −30° C.; 25 in-lb is a minimum for a medium impact rating and 150 in-lb for a high impact rating.

Blending and sequential copolymerization can be called external plasticization, but do not represent plasticization in the strict sense since they do not normally produce more than a minor shift in the Tg of the host homopolymer. This is because, with scarce exception, the copolymer "block" segments and blended-in polymeric components are incompatable with the host polymer so that flexibilization and low temperature properties derive from the mechanics of matrix-dispersed (soft) phase morphology rather than through specific interactions with the host polymer at the intermolecular level. "True" external plasticization, on the other hand, usually involves relatively strong interactions between polymer chain segments and (normally) low molecular weight molecules or oligomers which share some compatabilizing functionality. Examples of high external plasticization activity in polyolefins are scarce since intermolecular polymer-plasticizer interactions are limited to van der Waals' forces. It is to be expected, of course, that where high activity is found for a polyolefin, high impact strength can be imparted at a particular temperature if the Tg can be shifted to below the temperature of the test.

One approach to plasticizing polypropylene is disclosed in U.S. Pat. No. 3,201,364. In that patent polypropylene is blended with materials having a solubility parameter between 7.0 and 9.5 and a boiling point of over about 200° C. In U.S. Pat. No. 3,201,364, none of the materials cited, with the possible exception of "Nujol" mineral oil, are effective plasticizers of polypropylene in the sense of producing the degree of low temperature shift of Tg necessary to effect the levels of Gardner impact strength at −30° C. required to qualify even as medium impact polypropylene. In fact, most of the materials cited produce little if any shift in the Tg of highly isotactic polypropylene. Furthermore, even "Nujol", if it were a light enough mineral oil to effect the necessary Tg shift, would not produce the requisite Gardner impact strength by itself. It should be noted that the Gardner test is a very much more demanding measure of low temperature toughness, and relates much more reliably to real field performance than the flexural tests employed in U.S. Pat. No. 3,201,364. Note also the no impact tests of any kind are cited for support in the examples of U.S. Pat. No. 3,201,364.

We have discovered a new polymeric composition not having the disadvantages in the prior "plasticized" blends.

SUMMARY OF THE INVENTION

The present invention is directed to a polymeric composition having a high level of low temperature impact strength along with excellent stiffness. In particular, the present invention comprises the blend of:

(a) 78 to 65 percent by weight of a propylene homopolymer;

(b) 18 to 25 percent by weight of a linear low density ethylene copolymer; and (c) 4 to 10 percent by weight of a hydrocarbon plasticizer, said plasticizer being a hydrogenated, highly-branched, dimer of an alpha-olefin containing about 8–12 carbon atoms, and having a viscosity in the range of about 40 to 6.5 centistokes at 38° C.

Key aspects regarding the present invention revolve around selection of the particular components and the relative amounts of each component. The first component is a propylene homopolymer. This component provides the high strength crystalline matrix. The second compnent is a linear low density ethylene copolymer (LLDPE), which provides a spherical small particulate dispersed phase. The third component is a certain plasticizer oil and is particularly critical.

Of some significance, the compositions of the present invention possess high impact values at low temperatures without containing any rubber component. Properties of compositions representative of those covered in the present invention are shown in Tables 1 and 1a(-see the following examples). The following conclusions regarding characteristics of the present invention may be drawn:

(1) Very high impact strength at −30° C., i.e., >200 in-lb, is obtained only with certain combinations of plasticizer oil and LLDPE (e.g., samples 15569-11-2, 29-1 and 50-1). Neither component alone is effective at this temperature in the concentration range examined (e.g., samples 15569-36-1 and 11-1), although either alone can produce very high impact strength at 0° C. if their concentrations are high enough (e.g., 15569-30-3 and 11-1). Some intermediate combinations of oil and LLDPE approach MIPP impact levels (e.g., 15569-47-1, 25-1 and 25-2).

(2) The −30° C. toughening effect is very sensitive to the concentrations of the two components. The minimum effective oil level is around 4%w and the minimum LLDPE is near 18%w. Compare 15569-50-1 and 50-8 for an example of the sensitivity to concentration of LLDPE. FIG. 1 depicts the sensitivity of the toughness and stiffness of an 80/20 PP/LLDPE blend to the concentration of Synfluid 2Cs. It is evident that the intermediate ranges of toughness and stiffness will be difficult to reliably access because of extremely sharp concentration dependencies—toughness to very small change in oil in the range of 4 to 5%w, and stiffness to very small increments in oil level under about 1%w.

(3) The −30° C. toughening is also very sensitive to the molecular weight and structure of the oil. Trimer and tetramer counterparts of Synfluid 2CS (2CS being according to the present invention) do not work as is illustrated by comparison of 15569-50-9 and 50-10 with 15569-50-8. In addition, an interesting structural specificity may be associated with the higher external plasticizing activity of $C_{20}$ Synfluid compared to light mineral oil (e.g., 15569-50-8 vs 50-11); the Synfluids are complex mixtures of comparatively very highly branched molecules.

(4) Our rubberless high impact polypropylene (HIPP) systems display a substantially lower ratio of stiffness to impact strength than do conventional medium and high impact polypropylene systems, but higher than typical thermoplastic polyolefin (TPO) materials.

Toughening in our rubberless systems appears to stem from a combination of two distinct mechanisms: Compatible external plasticization which, by itself, falls short of the −30° C. criterion because its solubility limit in PP is reached before Tg is shifted below that test temperature; and the mechanics of the matrix-dispersed phase morphology created by LLDPE which alone fails for reasons presumably related to the plastic (rather than elastomeric) character of LLDPE. The origin of the effect of compatible and incompatible plasticization together is speculative, but a matter of some theoretical and practical interest because of its uniqueness.

That the toughening mechanism of our rubberless materials is different in kind from that operative in conventional HIPP systems is evident in their stress crazing (blushing) behavior. They show less blushing even than homopolymer and accordingly, very much less blushing than conventional toughened polypropylenes. This feature is remarkable in what amounts to a super-high impact system. We conclude that the rubberless toughening mechanism involves a pronounced favorable effect on internal stress distribution resulting from the major change made in the ratio of interphase moduli on introduction of the plasticizing oil.

One other important property of the rubberless HIPP materials of the present invention is see-through clarity; it is better than that of homopolymer in marked contrast to conventional toughened polypropylene systems which are opaque even at low and medium impact levels. Apparently the dispersed LLDPE particles, themselves of a size too small to cause significant low angle scatter, interfere with the normal scattering by spherulites. It is not clear from our photomicrographs, however, whether or not there has been a reduction of spherulite size. Optical haze in the rubberless systems (large angle scattering in the visible spectrum) is higher than in homopolymer but, again, very much lower than in conventional toughened polypropylenes.

BRIEF DESCRIPTION OF THE DRAWING

FIG. 1 is a plot of the sensitivity of the low temperature toughness and stiffness of 80/20 PP/LLDPE to concentration of external plasticizer.

DETAILED DESCRIPTION OF THE INVENTION

Before discussing the invention further, reference is made to the methods of measuring impact resistance and stiffness, employed in this description.

Impact resistance may be measured by a variety of methods. A frequently employed method is the notched Izod impact test (ASTM D-256). Until now, the generally low notched impact strength of even impact-improved polypropylene has been a matter of record, and the industry has designed parts such that sharp radii and grained or grooved surfaces are generally minimized. Hence, falling weight impact has historically been the primary indicator of toughness, and it remains a key discriminator between materials. The falling weight method employed in this description is the Gardner impact test. In that method an impacting device having a ⅝ inch diameter rounded tip rests on the injection molded circular sample disk (125 mil thick) which is supported at the rim. The sample disk is one of a series from the same composition, which has, in this case, been cooled to −30° C. A weight is dropped on the impacting device from a variable measured height. The sample disk is replaced after each drop; the height from which the weight is dropped is varied until the breaking point of the series of disks is defined. The impact strength, reported in units of Joules, ft-lbs or in-lbs, is the product of the mass of the dropped weight and the height of drop at which 50% of the disks resist breaking.

The stiffness of test strips molded from various compositions is reported as the 1% secant flexural modulus, determined in a standard test (ASTM D790) performed at 0.05 inch per minute. Flexural modulus may be reported in units of megapascals (MPa) or pounds per square inch (psi).

The first component is a propylene homopolymer. The polypropylene used in the present invention is any crystalizable polypropylene. Said polypropylene can be prepared by homopolymerizing propylene irrespective of the method used so long as a crystalizable polypropylene is found. The preferred polypropylenes are the substantially isotactic polypropylenes prepared by the Ziegler/Natta or $MgCl_2$-supported catalyst polymerization process.

The preferred polypropylene matrix components are highly crystalline homopolymers as defined by xylene soluble fractions of <5%w, preferably <3%w, in order to preserve maximum stiffness, strength and temperature resistance. Molecular weight is not a crucial factor in the range represented by melt flows of 0.1 to 20 g/10 min.

Linear low-density polyethylenes (LLDPE) which are blended with said propylene homopolymers and plasticizer oil according to this invention are random copolymers of ethylene with 1-15 mole percent, and typically with no more than 10% of higher alpha-olefin co-monomer, e.g., propylene, n-butene-1, n-hexene-1, n-octene-1 or methylpentene-1, produced over transition metal coordination catalysts. A preferred comonomer is 1-butene. Such polymers are commercially available. Commercial products generally are produced in liquid phase or vapor phase polymerization processes. LLDPE polymers suitable for use in this invention should have properties in the following ranges:

|  | Suitable | Preferred |
| --- | --- | --- |
| Melt Index, dg/min (ASTM D1238 Cond. E) | 0–16 | 1–12 |
| Density, g/cc | 0.912–0.935 | 0.917–0.935 |
| Tensile Properties (ASTM D638) |  |  |
| Yield, MPa | 8–17 | 8–15 |
| Break, MPa | 8–25 | 10–25 |
| Elongation at Break, % | 100–1200 | 400–1200 |
| Brittleness Temp., °C | < −80 | < −80 |

The hydrocarbon plasticizers employed in the invention are prepared by first dimerizing an alpha olefin containing 8–12 carbon atoms or a mixture of such alpha olefins. The dimer then is hydrogenated. The preparation of such hydrogenated dimers is described in U.S. Pat. Nos. 3,149,178, 3,382,291, 3,763,244, 3,780,128, 4,032,591 and 4,170,586, which descriptions are incorporated herein by reference. As reported in U.S. Pat. No. 4,032,591, the alpha olefin can be oligomerized in the presence of boron trifluoride and a cocatalyst such as n-butanol. This reaction provides a mixture of the dimer, trimer, and higher polymers which can be separated by distillation. By appropriate control of reaction conditions, it is possible to prepare the desired dimer in high yields. The recovered dimer then is hydrogenated, preferably employing the hydrogenation technique reported in U.S. Pat. No. 4,032,591. The hydrogenation reaction causes isomerization of the dimer to provide 1 and 2 carbon atom branching.

The precise structure and composition of the hydrocarbon plasticizer will vary slightly, depending principally upon the specific alpha olefin or alpha olefin mixture oligomerized and the reaction condtions employed in the oligomerization reaction, and to a somewhat lesser extent upon the hydrogenation conditions employed. The dimer will contain 16–24 carbon atoms, have a viscosity at 100° F. (38° C.) in the range of about 4.0 to 6.5 centistokes, and have a pour point below about −80° F. (−62° C.). The physical properties of the product made from n-decene-1 by the process of U.S. Pat. No. 4,032,591 are:

| Viscosity, cs |  |
| --- | --- |
| @ 210 F. | 1.8 |
| 100 F. | 5.3 |
| 32 F. | 19 |
| Pour Point, F. | −90 |
| Flash, COC, F. | 355 |
| Boiling Range |  |
| @ 5 mm Hg, F. | 374–384 |
| MW | 282 |

Commercial plasticizers according to this invention are available from Gulf Chemical Co. under the tradename Synfluid ® plasticizer. A preferred plasticizer is Synfluid 2CS.

The polymeric compositions of the present invention are prepared by blending the various components together. Blending can be carried out by conventional methods such as being compounded employing a rubber mill, a compounding extruder, a Banbury mixer or a Brabender mixer.

The relative amounts of the various compositions may be varied for desired properties, so long as the amounts are kept within the following relative quantities (percent by weight):

| Component | Suitable | Preferred |
| --- | --- | --- |
| Propylene homopolymer | 78 to 65 | 76 to 74 |
| LLDPE | 18 to 25 | 19 to 20 |
| Plasticizer oil | 4 to 10 | 5 to 6 |

The compositions of this invention may of course contain stabilizers and additives conventionally employed in similar polyolefin compositions, such as antioxidants, stabilizers against actinic radiation, antistatic additives, crystallinity nucleating agents, pigments and mineral fillers.

The compositions of the invention are suitable for the same uses as the commercially used impact-improved polypropylenes, e.g., for automobile trim parts, battery containers, tote boxes, crates, bottles, appliance parts and the like.

The invention is further illustrated by reference to the following examples, which are given for illustration only and are not meant to limit the invention to the particular reactants or conditions therein.

EXAMPLE 1

The blends were prepared by melt blending, generally in an extruder, starting with a mixture of pellets of PP and LLDPE in which the oil was sorbed. Blending conditions are not critical and are representative of the temperatures and compounding intensities generally used to pelletize and formulate typical isotactic polypropylene. For example, a C.W. Brabender Extruder, Type EX250, operated at 400° F. and 200 rpm, was employed for the samples cited as examples. Fabrication of specimens for physical testing was also representative of industry routines for polypropylenes. For the examples cited a standard ASTM family mold was used with an Arburg Altraunder Injection Molder, model 221-55-250, a machine with 25 ton clamping pressure and 1½ oz shot capacity. The various compositions and test results are presented below in Tables 1 and 1a.

TABLE 1

Rubberless Toughening of Polypropylene

| Composition, % w | Sample No. |  |  |  |  |  |  |  |  |  |
| --- | --- | --- | --- | --- | --- | --- | --- | --- | --- | --- |
|  | 15569 8-1 | 15569 23-1 | 15569 8-2 | 15569 36-1 | 15569 30-3 | 15569 41-1 | 15569 38-1 | 15569 11-1 | 15569 47-1 | 15569 47-2 |
| Polypropylene (5520) | 100 |  | 95.0 | 93$^b$ | 90$^b$ | 95.0 |  |  |  |  |
| Polypropylene (DP5084) |  | 100 |  |  |  |  | 86.8 | 80.0 | 80.7 | 80.7 |
| LLDPE (UC 7047) |  |  |  |  |  |  | 13.2 | 20.0 | 12.3 | 12.3 |
| Synfluid 2Cs (dimer) |  |  | 5.0 | 7.0 | 10.0 |  |  |  | 7.0 |  |
| Synfluid 4CS (trimer) |  |  |  |  |  |  |  |  |  | 7.0 |
| Synfluid 6CS (tetramer) |  |  |  |  |  |  |  |  |  |  |
| Light Mineral Oil (Draketex 50) |  |  |  |  |  | 5.0 |  |  |  |  |
| Polypropylene Copolymer (7522; 15 f$_c$) |  |  |  |  |  |  |  |  |  |  |
| Properties |  |  |  |  |  |  |  |  |  |  |
| Melt Flow, dg/min | 5.4 | 2.2 | 7.5 | 1.4 | 1.6 | 7.2 | 2.0 | 2.7 | 3.8 | 3.7 |

TABLE 1-continued

Rubberless Toughening of Polypropylene

| Composition, % w | 15569 8-1 | 15569 23-1 | 15569 8-2 | 15569 36-1 | 15569 30-3 | 15569 41-1 | 15569 38-1 | 15569 11-1 | 15569 47-1 | 15569 47-2 |
|---|---|---|---|---|---|---|---|---|---|---|
| Tensile Strength @ Yield, psi | 4780 | 5104 | 3996 | 3814 | 3458 | 3870 | 4228 | 3870 | 3170 | 3240 |
| Tensile Strength @ Break, psi | 2436 | 2036 | NB | 3128 | NB | NB | 2250 | 1646 | NB | NB |
| Elongation @ Break, % | 128 | 47 | NB | 334 | NB | NB | 318 | 289 | NB | NB |
| 1% Secant Modulus, psi × 10⁻³ | 200 | 214 | 130 | 109 | 91 | 114 | 163 | 145 | 80 | 88 |
| Notched Izod, $\frac{ft-lb}{in-notch}$ | | | | | | | | | | |
| RT | 0.44 | — | 0.67 | 1.36 | 1.54 | — | 0.97 | 1.54 | 2.50 | 2.36 |
| 0° C. | 0.38 | — | 0.42 | 0.74 | 0.94 | — | 0.45 | 0.46 | 1.31 | 1.00 |
| −30° C. | — | — | — | 0.39 | 0.40 | — | 0.35 | — | 0.66 | 0.50 |
| Gardner Impact, in-lb | | | | | | | | | | |
| RT | 30.3 | — | 142 | 206 | 254 | — | 200 | 289 | 219 | 238 |
| 0° C. | 4.7 | — | 26.8 | 36 | 225 | — | 22 | 258 | 256 | 266 |
| −30° C. | 3.0 | 3.1 | 3.7 | 6 | 10 | 4 | 5 | 6.9 | 21.3 | 6.2 |
| Glass Transition, °C.[a] | 5 | 5 | −11 | −16 | −23 | −10 | — | — | −16 | −10 |

[a] Rheometrics torsional modulus temperature sweep (1 Hz).
[b] WRS 5361 polypropylene homopolymer powder.

TABLE 1A

Rubberless Toughening of Polypropylene

| Composition, % w | 15569 47-3 | 15569 47-4 | 15569 50-1 | 15569 50-2 | 15569 50-3 | 15569 50-4 | 15569 25-1 | 15569 25-2 |
|---|---|---|---|---|---|---|---|---|
| Polypropylene (5520) | | | | | | | | |
| Polypropylene (DP5084) | 80.7 | 80.7 | 74.4 | 74.4 | 74.4 | 74.4 | 79.2 | 77.6 |
| LLDPE (UC 7047) | 12.3 | 12.3 | 18.6 | 18.6 | 18.6 | 18.6 | 19.8 | 19.4 |
| Synfluid 2CS (dimer) | | | 7.0 | | | | 1.0 | 3.0 |
| Synfluid 4CS (trimer) | | | | 7.0 | | | | |
| Synfluid 6CS (tetramer) | 7.0 | | | | 7.0 | | | |
| Light Mineral Oil (Draketex 50) | | 7.0 | | | | 7.0 | | |
| Polypropylene Copolymer (7522; 15 f$_c$) | | | | | | | | |
| Properties | | | | | | | | |
| Melt Flow, dg/min | 3.5 | 3.6 | 3.6 | 3.3 | 3.2 | 3.4 | 2.2 | 2.7 |
| Tensile Strength @ Yield, psi | 3250 | 3220 | 3284 | 3310 | 3352 | 3384 | — | — |
| Tensile Strength @ Break, psi | NB | NB | NB | 2725 | NB | NB | — | — |
| Elongation @ Break, % | NB | NB | NB | 258 | NB | NB | — | — |
| 1% Secant Modulus, psi × 10⁻³ | 92 | 86 | 87 | 92 | 94 | 88 | 100 | 93 |
| Notched Izod, $\frac{ft-lb}{in-notch}$ | | | | | | | | |
| RT | 1.95 | 2.60 | 2.30 | 2.27 | 2.21 | 2.46 | — | — |
| 0° C. | 0.93 | 1.07 | 1.25 | 1.13 | 1.01 | 1.20 | — | — |
| −30° C. | 0.35 | 0.47 | 0.58 | 0.38 | 0.33 | 0.48 | — | — |
| Gardner Impact, in-lb | | | | | | | | |
| RT | 234 | 235 | 243 | 218 | 232 | 226 | — | — |
| 0° C. | 274 | 245 | 237 | 234 | 243 | 238 | — | — |
| −30° C. | 6.0 | 5.6 | 8.6 | 5.7 | 4.1 | 3.8 | 19 | 22 |
| Glass Transition, °C.[a] | −9 | −12 | −21 | −15 | −16 | −16 | — | — |

| Composition, % w | 15569 11-2 | 15569 29-1 | 15569 50-6 | 15569 50-8 | 15569 50-9 | 15569 50-10 | 15569 50-11 | TYPICAL 7522 |
|---|---|---|---|---|---|---|---|---|
| Polypropylene (5520) | | | | | | | | |
| Polypropylene (DP5084) | 76.0 | 76.0 | 76.0 | 69.7 | 69.7 | 69.7 | 69.7 | |
| LLDPE (UC 7047) | 19.0 | 19.0 | 19.0 | 23.3 | 23.3 | 23.3 | 23.3 | |
| Synfluid 2CS (dimer) | 5.0 | 5.0 | | 7.0 | | | | |
| Synfluid 4CS (trimer) | | | | | 7.0 | | | |
| Synfluid 6CS (tetramer) | | | | | | 7.0 | | |
| Light Mineral Oil (Draketex 50) | | | 7.0 | | | | 7.0 | |
| Polypropylene Copolymer (7522; 15 f$_c$) | | | | | | | | 100 |
| Properties | | | | | | | | |
| Melt Flow, dg/min | 4.5 | 3.2 | 3.0 | 3.4 | 3.3 | 3.2 | 3.3 | 4.5 |
| Tensile Strength @ Yield, psi | 3086 | 3170 | 3575 | 3128 | 3154 | 3210 | 3144 | 3900 |
| Tensile Strength @ Break, psi | NB | NB | NB | NB | NB | 2983 | NB | 3000 |
| Elongation @ Break, % | NB | NB | NB | NB | NB | 359 | NB | 250 |
| 1% Secant Modulus, psi × 10⁻³ | 90 | 85 | 99 | 81 | 84 | 90 | 89 | 165 |
| Notched Izod, $\frac{ft-lb}{in-notch}$ | | | | | | | | |
| RT | 2.84 | 2.60 | 2.02 | 3.20 | 3.14 | 2.85 | 2.94 | 1.8 |

TABLE 1A-continued

| Rubberless Toughening of Polypropylene | | | | | | | | |
|---|---|---|---|---|---|---|---|---|
| 0° C. | 1.34 | 1.24 | 0.92 | 1.70 | 1.32 | 1.19 | 1.32 | 0.7 |
| −30° C. | — | 0.44 | 0.35 | 0.77 | 0.60 | 0.51 | 0.54 | — |
| Gardner Impact, in-lb | | | | | | | | |
| RT | 347 | 233 | 241 | 223 | 234 | 237 | 215 | — |
| 0° C. | 309 | — | 246 | 231 | 230 | 233 | 256 | — |
| −30° C. | 310 | 259 | 3 | 217 | 16 | 8.7 | 14 | 25 |
| Glass Transition, °C.[a] | — | — | −10 | −20 | −15 | −10 | −23 | — |

[a]Rheometrics torsional modulus temperature sweep (1 Hz).

What is claimed is:

1. A polymeric composition having a high level of low temperature impact strength, said composition comprising the blend of:
   (a) 78 to 65 percent by weight of a propylene homopolymer;
   (b) 18 to 25 percent by weight of a linear low density ethylene copolymer; and
   (c) 4 to 10 percent by weight of a hydrocarbon plasticizer, said plasticizer being a hydrogenated, highly-branched, dimer of an alpha-olefin containing about 8–12 carbon atoms, and having a viscosity in the range of about 40 to 6.5 centistokes at 38° C.

2. The composition according to claim 1 wherein said linear low density ethylene copolymer is the product of polymerization of ethylene with up to 15 mole percent of at least one $C_3$–$C_8$ alpha olefin monomer over a transition metal-based coordination catalyst and which has a density in the range from 0.912 to 0.935 g/cc and a melt index (ASTM D 1238-Condition E) in the range from 0 to 16.

3. The composition according to claim 2 wherein said linear low density ethylene copolymer is an ethylene-1-butene copolymer.

4. The composition according to claim 1 wherein the relative amounts of each component are:
   76 to 74 percent by weight propylene homopolymer,
   19 to 20 percent by weight ethylene copolymer, and
   5 to 6 percent by weight plasticizer.

5. The composition according to claim 1 wherein said propylene homopolymer is a substantially isotactic polypropylene.

6. The composition according to claim 5 where said propylene homopolymer has a xylene solubles fraction of less than five percent by weight and a melt flow of 0.1 to 20 g/10 minutes.

7. The composition according to claim 1 wherein said linear low density ethylene copolymer has a density below about 0.935 g/cc.

8. The composition according to claim 1 wherein said low temperature impact strength is greater than 200 in-lbs, Gardner impact at −30° C.

* * * * *